April 2, 1963

R. A. CRIBBS 3,084,306

BATTERY CONNECTOR

Filed July 11, 1960

ROBERT A. CRIBBS
INVENTOR
HUEBNER & WORREL
ATTORNEYS

BY Richard M. Worrel 3,084,306
BATTERY CONNECTOR
Robert A. Cribbs, P.O. Box 232, Stratford, Calif.
Filed July 11, 1960, Ser. No. 42,085
4 Claims. (Cl. 339—239)

The present invention relates to a battery connector and more particularly to a device for electrically connecting a power cable to a battery post of a storage battery in a dependable, yet readily releasable, manner.

A conventional battery connector of the type usually installed as standard equipment in most automobiles is a radially slit collar releasably fitted about the battery post of the storage battery and having spaced ears outwardly extended on opposite sides of the split or break in the collar. A bolt is extended through the ears, and a nut is screw-threaded on the bolt for urging the ears together thereby tightly clamping the collar about the battery post.

Quite frequently, it requires considerable time and effort, bending, or even partial destruction, to remove the described conventional battery connector from the battery post. While these difficulties of removal are essentially caused by corrosion of the parts, the use of a simple nut and bolt to control contraction and expansion of the battery connector is perhaps one of the least desirable means for accomplishing this purpose.

There have been numerous battery connectors developed in an effort to solve the described problems. However, the conventional connector referred to above is still widely employed. While many of said developments are easier to connect or disconnect than the above described connector, they have usually been relatively too complex or too expensive in comparison with the advantages provided to have universal appeal.

Accordingly, it is an object of the present invention to provide a battery connector for attachment to a battery post of a storage battery in dependable, yet readily releasable, manner.

Another object is to provide a battery connector of simple and economical construction.

Another object is to provide a battery connector which is movable between clamping and releasing positions without the use of any auxiliary tools.

Another object is to replace the conventional bolt and nut as a fastener for constricting the collar of a battery connector about a battery post and thereby to avoid the problems incident to corrosion of the connector and the post.

Another object is to provide an adjustable battery connector.

Another object is to provide a battery connector which is reversible for use on either side of a battery.

These together with other objects will become more fully apparent upon reference to the following description and accompanying drawing.

In the drawing:

FIG. 1 is a top plan view of a battery connector, embodying the principles of the present invention, connected to a battery cable, and clamped about a battery post shown in dashed lines.

FIG. 2 is a side elevation of the battery connector of FIG. 1.

FIG. 3 is an exploded, perspective view of the subject battery connector with a portion thereof being broken away for illustrative convenience.

Referring more particularly to the drawing, the battery connector of the subject invention includes an elongated main shank 10 having a longitudinally extended, endwardly opening bore 11 adapted to receive the conductor 12 of an electrical battery cable 13. The conductor is covered with insulation 14 endwardly abutting the shank. The cable is electrically secured to the shank by soldering, or the like. A radially split, battery post-receiving collar 16 is secured to the shank so that the latter extends radially outwardly from the collar. The collar provides an internal bore 17 axially extended transversely of the shank and having an inside diameter slightly larger than the diameter of a battery post, as 18, with which the connector is to be employed. The collar has a radial slot 19 therein.

Upper and lower pairs of mounting and wedging ears 22 and 23, respectively, are integrally outwardly extended from the collar 16 in substantially diametrically opposite relation to the main shank 10. All of the ears are in spaced relation to each other but corresponding upper ears and corresponding lower ears are resiliently movable toward and away from their respective upper and lower ears incident to application of sufficient pressure thereagainst. It is evident that the ears extend radially outwardly on opposite sides of the slot 19 in the collar and, together with opposite halves of the collar, define opposed clamping elements having adjacent interconnected ends at the main shank and opposite free ends defined by the ears. The upper and lower ears of each pair provide outwardly disposed, concave sockets 24 which are fractionally cylindrical but preferably slightly less than semicylindrical, as is evident in FIG. 1. The sockets of each upper and lower pair of ears are of the same shape and are substantially concentric to a common axis parallel to the axis of the collar bore 17. The space 25 between the pairs of ears is in a common plane with the slot, which plane diametrically bisects the collar. Further, it is emphasized that the upper ears are spaced from the lower ears as is evident in FIGS. 2 and 3, thereby providing a notch 26 located in a plane normal to the axis of the collar bore and to the plane of the slot. The axes of the sockets are also located in a common plane normal to the plane of the notch.

An elongated fastening bolt 30 includes a shank 31 positioned in the notch 26 between the upper and lower ears 22 and 23 and is extended transversely of the axes of the bore 17 and of the sockets 24. The shank has a threaded portion 32 outwardly extended from the mounting ears. An arcuate hook 33 is integrally outwardly extended from the shank outwardly adjacent to the wedging ears. It is to be noted that the bolt is oriented so that the hook is in the plane of the notch 26, as is illustrated in FIG. 2.

A semi-cylindrical mounting or bearing block 36 provides a bore 37 axially slidably receiving the threaded portion 32 of the bolt 30, a convex outer face 38 complementarily fitted in the sockets 24 of the mounting ears 22, and an outwardly disposed flat face 39 substantially normal to the shank 31. A wing nut 41 includes a hub 42 screw-threadably turned on the threaded portion of the shank 31 for mating engagement with the flat face of the block, and a pair of outwardly projected manipulating wings 43. The wing nut is threaded onto the shank so that with the axis of the shank in the common plane of the socket axes and the hook 33 in the plane of the notch and curved outwardly away from the collar, the hook is concentric to the axis of the sockets in the wedging ears, all as illustrated in FIG. 1.

A U-shaped bracket 46 includes a pair of spaced legs 47 interconnected by a central portion 48. Circular wedging discs 50 are individually connected to the legs in spaced, coaxial relation to each other and are individually complementarily fitted in the sockets 24 of the wedging ears 23 and coaxially of said sockets. The discs are located in planes on opposite sides of the hook 33 when the latter is in its said coplanar, concentric position. A pin 51 interconnects the discs eccentrically thereof, and is in slidable engagement with the hook. An elongated handle 52 is rigidly outwardly extended from the central portion of the bracket. The handle is movable into a clamping position, as viewed in FIGS. 1 and 2, extended alongside of the main shank 10 wherein the pin and discs are wedged between the wedging ears 23 and the hook 33 thereby resiliently to urge the mounting and wedging ears together and diametrically to constrict the collar 16. Of course, the threaded position of the nut on the shank determines whether any wedging action occurs as well as the extent of wedging. Apart from the frictional fitting of the parts, the handle is releasably retained in clamping position since the pin is disposed on the side of the common plane of the axes of the bolt shank 31 and the sockets 24 toward the collar, in an over-center relation. It is also to be noted that in wedging against the hook, the pin forces the same against the collar. The handle is also movable into an unclamping position, not shown, with the handle outwardly angularly related to the main shank, with the pin on the opposite side of said common plane, and with the wedging surface of the pin to the left and upwardly, as viewed in FIG. 1. This relieves wedging pressure between the wedging ears and hook thereby to allow resilient expansion of the collar. The handle, discs, and pin can be completely disassembled from the ears and bolt in the unclamping position.

Operation

The operation of the described embodiment of the subject invention is believed to be readily apparent and is briefly summarized at this point.

From the foregoing, it will be evident that a battery connector has been provided which can be conveniently, quickly and dependably constricted about a battery post in intimate electrical connection therewith. Of primary significance, however, is the ease with which the connector is removed from the battery post notwithstanding corrosion of the connector and/or the post. The connector may be inverted if used on either side of a battery. Also the connector is readily adjustable for fitting various sizes of battery posts and for insuring tight constriction of the collar during continued uses of the connector.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A battery connector comprising a collar having a central bore and a radial slot axially of the bore, the collar providing substantially semi-cylindrical sockets axially parallel to the bore on opposite sides of the slot and said collar being substantially symmetrical on opposite sides of the slot, first and second rotatable members having semi-cylindrical surfaces interchangeably mounted in the sockets of the collar on opposite sides of the slot for rotation about axes substantially parallel to the bore, the semi-cylindrical sockets and surfaces of the rotatable members being of substantially the same radius for interchangeable fitted engagement of said members in the sockets, a tension element radially and slidably extended through the first of the members transversely of the slot and connected to the second member eccentrically of said second member's axis, means mounted on the tension element which is separate from the first member but engaged with the first member and adjustable to regulate the effective length of the tension element between said members and by such engagement translating pivotal movement of the element into corresponding rotary movement of the first member in its socket, and means connected to the second member for rotating the second member in its socket to tension and to release the tension element whereby the portions of the collar on opposite sides of the slot are respectively urged toward each other and released.

2. A battery connector comprising a collar having a central bore and a radial slot disposed in a plane axially of the bore, said collar being symmetrical about said plane, first and second rotatable members mounted on the collar on opposite sides of the slot for rotation about fixed axes substantially parallel to the bore, said members being interchangeable, a rigid tension element slidably extended through the first member substantially radially from the axis of the first member transversely of the slot for pivotal movement toward and from the collar and rotatably connected to the second member eccentrically of said second member's axis, means screw-threadably connected to the tension element and engaged with the first member for securing said element in adjusted extent of radial extension therefrom, said screw-threaded means and the first member having faces in relative rotatable engagement, the screw-threaded means and its face being rotatable about the tension element, the first member and its face being held against rotation with the screw-threaded means about the tension element by engagement of the first member with the collar, and the screw-threaded means and the first member being rotatable with the tension element about the fixed axis of the first member by engagement of the faces which translates pivotal movement of the tension element inwardly and outwardly of the slot into corresponding rotation of the first member about its axis, and means connected to the second member for rotating said second member about its axis to tension and to release the tension element.

3. A battery connector comprising a collar having a central bore and a radial slot axially of the bore; substantially identical pairs of ears integral with the collar outwardly extended from the collar on opposite sides of the slot, the ears of each pair being spaced axially of the collar and providing a notch therebetween in a plane substantially normal to the axis of the bore, the collar being sufficiently resilient that the ears can be compressed toward each other to constrict the collar and released to permit the collar to expand, the ears of each pair having axially aligned substantially semi-cylindrical sockets parallel to the bore of the collar and the sockets of the opposite pairs being oppositely outwardly disposed, said collar being substantially symmetrical on opposite sides of the slot and on opposite sides of the notch; a block rotatably fitted in the sockets of a pair of the ears for rotation about the axis of said sockets; a pair of spaced elements individually rotatably fitted in the sockets of the opposite pair of ears for rotation about the axis of said sockets, the sockets, block and spaced elements being of substantially the same radius; a pin rigidly interconnecting the spaced elements eccentrically of their respective sockets; a tension element slidably extended radially through the block, through the notches between the ears of each pair for pivotal movement toward and from the collar incident to rotation of the block in its sockets and having an end pivotal between the spaced elements connected to the pin; a nut screw-threadably mounted on the tension element opposite to the block from the collar rotatable about said tension element relative to the block and said block and nut having substantially flat faces in engagement transmitting pivotal movement of the tension element into corresponding rotational movement of the block in its socket; and means for rotating the spaced elements in their respective sockets whereby the eccentric pin tensions and releases the tension element.

4. A battery connector comprising a collar having a central bore and a radial slot axially of the bore; substantially identical pairs of parallel ears integral with the collar outwardly extended from the collar on opposite sides of the slot, the ears of each pair being spaced axially of the collar and providing a notch therebetween in a plane substantially normal to the axis of the bore, the collar being sufficiently resilient that the ears can be compressed toward each other to constrict the collar and released to permit the collar to expand, the ears of each pair having axially aligned fractionally cylindrical sockets which are of substantially the same radius and are axially parallel to the bore of the collar, the sockets of the opposite pairs being oppositely outwardly disposed; a block having a semi-cylindrical portion fitted in the sockets of a pair of the ears for rotation about the axis of said sockets and having an outwardly disposed substantially flat face; a pair of spaced discs individually rotatably fitted in the sockets of the opposite pair of ears; a pin rigidly interconnecting the spaced elements eccentrically of their respective sockets, the block and the discs being of substantially the same radius as the sockets and being interchangeable in the sockets; a tension bolt slidably extended through the block substantially normal to its flat face substantially radially of the blocks' respective sockets, through the notches between the ears of each pair for pivotal movement toward and from the collar incident to rotation of the block in its sockets and having an end portion extended between the spaced elements providing a hook engaged over the pin; a nut screw-threadably mounted on the tension member having a flat face in engagement with the flat face of the block for rotation in facing engagement therewith whereby the effective length of the tension bolt can be adjusted without disturbing the engagement of the block in its sockets and the parallel relation of the axis of the block and the bore of the collar and pivotal movement of the bolt toward and from the collar imparts corresponding rotary movement of the block in its sockets by engagement of the flat faces of the nut and the block; and a lever connected to the spaced discs for rotating the discs in their respective sockets whereby the eccentric pin tensions and releases the tension bolt to constrict and to release the collar.

References Cited in the file of this patent

UNITED STATES PATENTS

| | | |
|---|---|---|
| 40,948 | Rymes | Dec. 15, 1863 |
| 549,774 | Forst | Nov. 12, 1895 |
| 1,393,811 | Mossholder et al. | Oct. 18, 1921 |
| 1,696,531 | Eaton | Dec. 25, 1928 |
| 1,754,053 | Schlaegel | Apr. 8, 1930 |
| 1,873,775 | McMaster et al. | Aug. 23, 1932 |
| 1,977,179 | Fisch | Oct. 16, 1934 |
| 2,009,403 | Koops | July 30, 1935 |
| 2,445,946 | Harper | July 27, 1948 |
| 2,878,460 | Coleman | Mar. 17, 1959 |